(12) United States Patent
Kondo

(10) Patent No.: US 8,352,251 B2
(45) Date of Patent: Jan. 8, 2013

(54) AUDIO SIGNAL PROCESSING CIRCUIT

(75) Inventor: Kazuhiko Kondo, Ogaki (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 490 days.

(21) Appl. No.: 12/576,598

(22) Filed: Oct. 9, 2009

(65) Prior Publication Data
US 2010/0094641 A1   Apr. 15, 2010

(30) Foreign Application Priority Data

Oct. 10, 2008 (JP) ................................ 2008-263619

(51) Int. Cl.
*G01L 19/14* (2006.01)
(52) U.S. Cl. ........................................ 704/205; 341/126
(58) Field of Classification Search .......... 704/205–207, 704/226, 500–504; 341/115, 118, 126
See application file for complete search history.

(56) References Cited

U.S. PATENT DOCUMENTS

| 7,119,724 | B1* | 10/2006 | Asami ........................... 341/118 |
| 7,324,024 | B2* | 1/2008 | Fujiyama et al. ................ 341/61 |
| 7,508,327 | B2* | 3/2009 | Wang et al. ..................... 341/61 |
| 2007/0192390 | A1* | 8/2007 | Wang et al. .................... 708/270 |
| 2009/0003497 | A1* | 1/2009 | Kino et al. ..................... 375/346 |

FOREIGN PATENT DOCUMENTS

JP          3820331 B2    6/2006

* cited by examiner

*Primary Examiner* — Abul Azad
(74) *Attorney, Agent, or Firm* — Cantor Colburn LLP

(57) ABSTRACT

An audio signal processing circuit is provided which comprises an ADC which samples an audio signal at a predetermined sampling frequency, a high-band compensation processor which compensates a signal sampled by the ADC to a frequency band which is higher than a signal band sampled by the sampling frequency, and an encoding unit which encodes a signal processed by the high-band compensation processor.

4 Claims, 6 Drawing Sheets

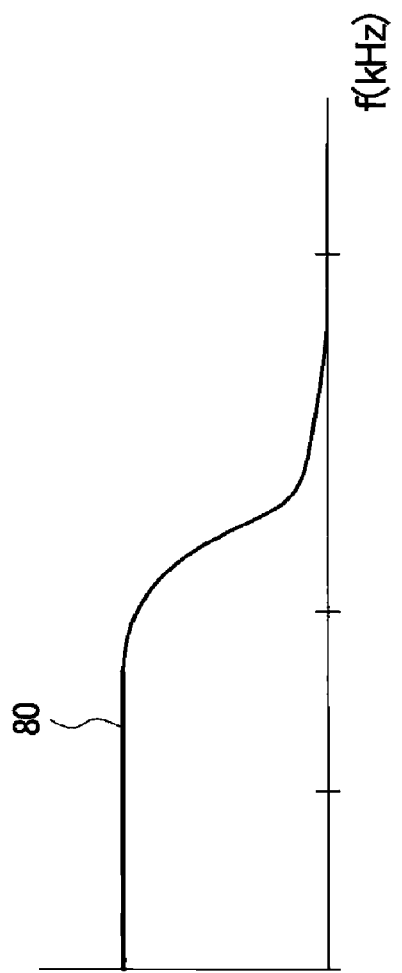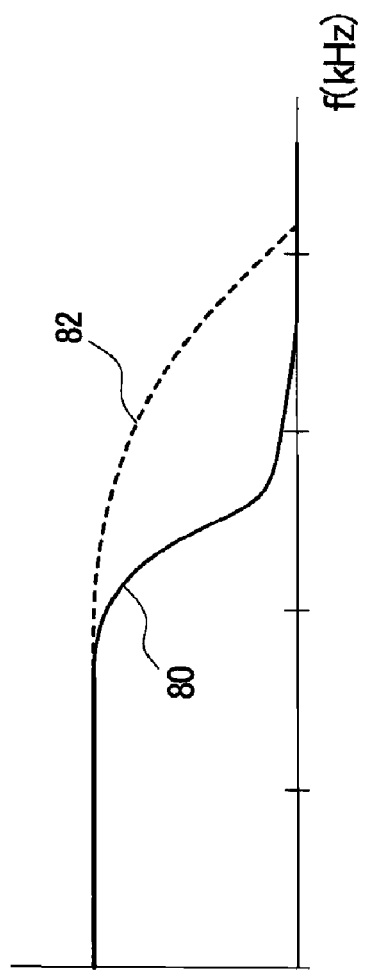

AUDIO SIGNAL PROCESSING CIRCUIT

CROSS-REFERENCE TO RELATED APPLICATIONS

The entire disclosure of Japanese Patent Application No. 2008-263619 including specification, claims, drawings, and abstract is incorporated herein by reference.

BACKGROUND OF THE INVENTION

1. Field of the Invention

The present invention relates to an audio signal processing circuit with reduced power consumption.

2. Description of the Related Art

In a voice recorder or the like, a process is executed where an audio signal is compressed and recorded in a non-volatile memory. In this process, an encoder IC of the voice recorder digitizes an analog signal into a digital signal with an analog/digital converter circuit, generates compressed music data with an encoder, and stores the data in the non-volatile memory.

FIG. 6 shows an example of an audio signal processing circuit 100 of related art. As shown in FIG. 6, the audio signal processing circuit 100 of related art comprises an analog/digital converter (ADC) 10, a clock controller 12, and an encoding unit 14. A non-volatile memory 102 is connected to the audio signal processing circuit 100, and an audio signal processed by the audio signal processing circuit 100 is recorded.

The ADC 10 samples an input analog audio signal at a predetermined sampling frequency, to digitize the input signal. The clock controller 12 generates a clock so that the sampling frequency of the ADC 10 is set to, for example, 44.1 kHz, and supplies the clock to the ADC 10. The encoding unit 14 encodes the audio signal which is digitized by the ADC 10 according to a predetermined compression method, and stores the encoded signal in the non-volatile memory 102.

In the audio signal processing circuit 100, as the sampling frequency of the ADC 10 is increased, the power consumption in the ADC 10 is also increased.

SUMMARY OF THE INVENTION

According to one aspect of the present invention, there is provided an audio signal processing circuit which converts an audio signal into a digital signal, comprising an analog-to-digital converter which converts the audio signal into a digital audio signal of a predetermined sampling frequency, a high-band compensation processor which compensates the digital audio signal converted by the analog-to-digital converter to a frequency band which is higher than a signal band sampled by the sampling frequency, and an encoding unit which encodes the audio signal processed by the high-band compensation processor.

BRIEF DESCRIPTION OF THE DRAWINGS

A preferred embodiment of the present invention will be described in further detail based on the following drawings, wherein:

FIG. 3A is a diagram for explaining a high-band compensation process in the preferred embodiment of the present invention;

FIG. 3B is a diagram for explaining the high-band compensation process in the preferred embodiment of the present invention;

DESCRIPTION OF THE PREFERRED EMBODIMENT

Figure 1:
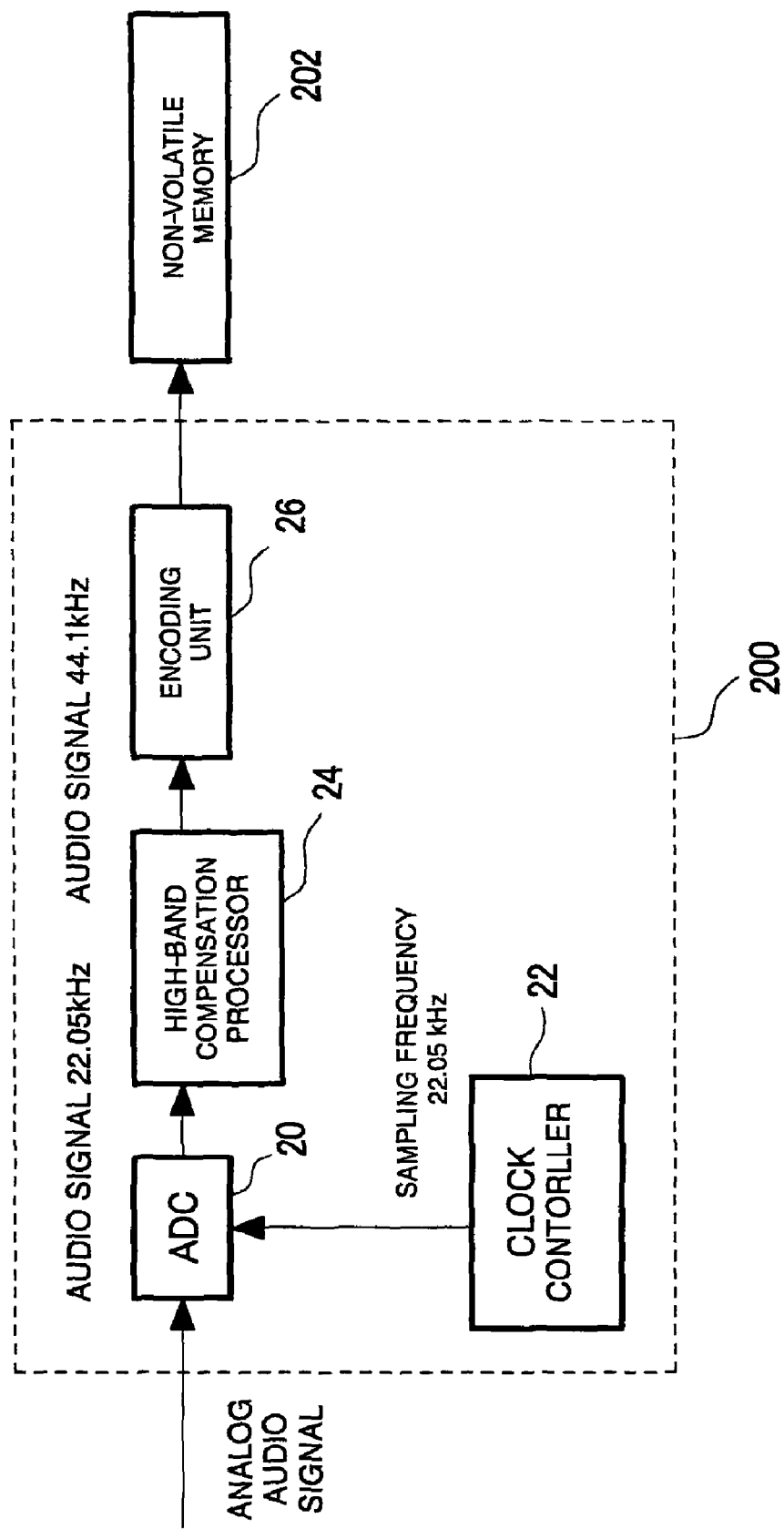
FIG. 1 is a diagram showing a structure of an audio signal processing circuit according to a preferred embodiment of the present invention.

As shown in FIG. 1, an audio signal processing circuit 200 according to a preferred embodiment of the present invention comprises an analog/digital converter (ADC) 20, a clock controller 22, a high-band compensation processor 24, and an encoding unit 26. A non-volatile memory 202 is connected to the audio signal processing circuit 200. The audio signal processing circuit 200 digitizes an analog audio signal, applies a compression process or the like to the digitized signal, and stores the processed signal in the non-volatile memory 202.

The ADC 20 applies a process corresponding to that of the sampling unit. The ADC 20 receives an input of an analog audio signal, digitizes the audio signal in synchronization with a sampling clock generated by the clock controller 22, and outputs the digitized audio signal. For example, the ADC 20 converts a sample into a digital signal of 8 bits or 16 bits, and outputs the converted signal to the high-band compensation processor 24.

The clock controller 22 generates a sampling clock to be used in the ADC 20, and outputs the sampling clock to the ADC 20. The clock controller 22 may comprise, for example, a phase-locked loop (PLL) circuit. In the present embodiment, the clock controller 22 generates and outputs a clock which results in a sampling frequency which is lower than the sampling frequency of the audio signal which is input to the encoding unit 26. For example, when the sampling frequency of the audio signal which is input to the encoding unit 26 is 44.1 kHz, the clock controller 22 generates and outputs a clock which results in a sampling frequency of ½ of the sampling frequency of the audio signal, that is, 22.05 kHz.

In this manner, in the audio signal processing circuit 200 according to the present embodiment, with the use of a clock which results in a sampling frequency at the ADC 20 which is lower than the sampling frequency of the audio signal which is input to the encoding unit 26, it is possible to lower the frequency of the clock, and the power consumption at the ADC 20 can be reduced.

The high-band compensation processor 24 extends the band of the signal digitized by the ADC 20 to a higher frequency band than the band of the digitized signal. For the high-band compensation process, it is possible to apply a technique described in Japanese Patent No. 3820331.

Figure 2:
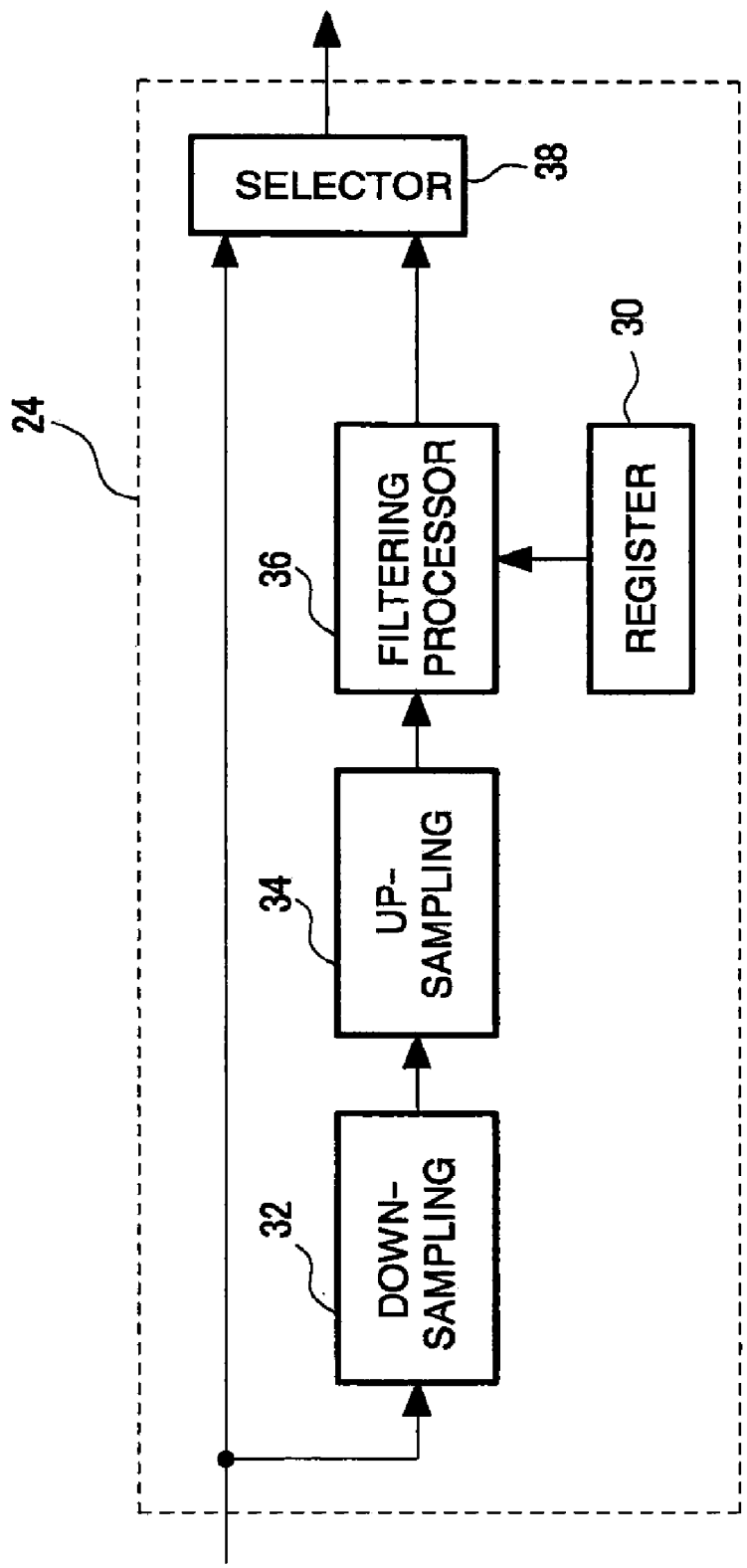
FIG. 2 is a diagram showing an example structure of a high-band compensation processor in the preferred embodiment of the present invention.

A structure of the high-band compensation processor 24 will be described with reference to FIGS. 2 and 3. An example configuration shown in FIGS. 2 and 3 has a characteristic that the signal to which the high-band compensation process is applied is output without any further processing. As shown in FIG. 2, the high-band compensation processor 24 comprises a register 30, a down-sampling unit 32, an up-sampling unit 34, a filtering processor 36, and a selector 38.

The down-sampling unit 32 applies a down-sampling process on to input signal. More specifically, the down-sampling unit 32 removes a part of the input signal at a predetermined frequency and reduces a sampling number per unit time of the input signal, and outputs the down-sampled signal to the up-sampling unit 34. In other words, the down-sampling unit 32 thins the input signal at the predetermined frequency and outputs the thinned signal.

The up-sampling unit 34 applies an up-sampling process on an input signal. More specifically, the up-sampling unit 34 inserts a 0-signal to a signal portion removed at the down-sampling unit 32, and outputs the processed signal to the filtering processor 36. In other words, the up-sampling unit 34 inserts the 0-signal at a predetermined frequency to the signal thinned by the down-sampling unit 32 and increases the sampling number per unit time, and outputs the processed signal.

The filtering processor 36 applies a filtering process to the signal to which the 0-signal is inserted at the predetermined frequency, based on a filtering coefficient stored in the register 30. With this process, the filtering processor 36 corrects the inserted 0-signal to a suitable value, and outputs a signal in which the high-band portion of the signal is compensated and leveled. A frequency characteristic obtained by the compensation process can be adjusted by the filtering coefficient stored in the register 30.

The selector 38 selectively outputs the signal before the high-band compensation process is applied, or the signal which is output from the filtering processor 36. When the high-band compensation process is to be applied, the selector 38 selects and outputs the signal which is output from the filtering processor 36.

FIG. 3A shows a frequency characteristic 80 of a signal which is output from the ADC 20 and to which the high-band compensation process is not yet applied. When the high-band compensation process is applied to this signal, the signal of a high frequency region is compensated, resulting in a signal of a frequency characteristic 82 which is higher than the signal which is output from the ADC 20, as shown in FIG. 3B.

Figure 4:
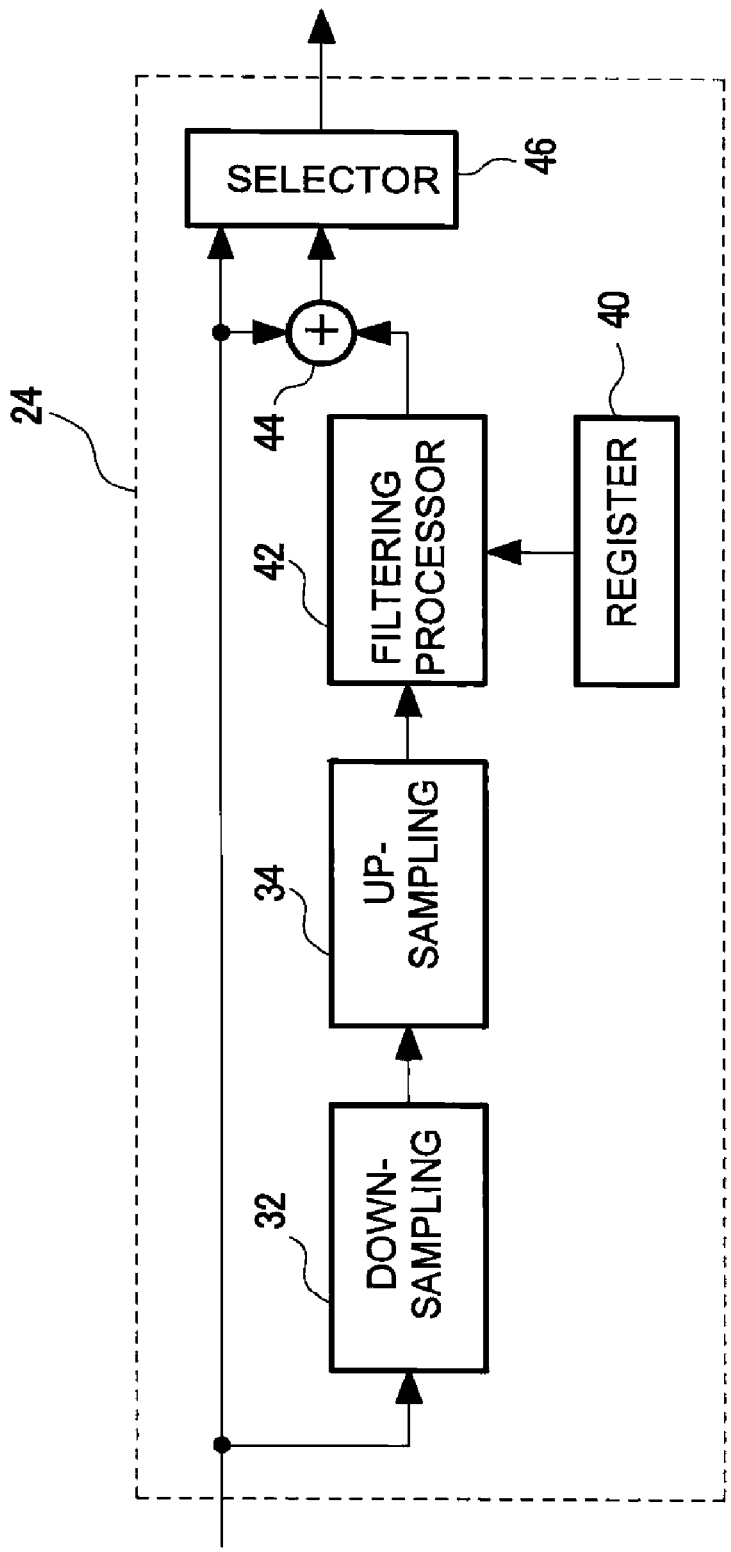
FIG. 4 is a diagram showing an example structure of the high-band compensation processor in the preferred embodiment of the present invention.

Next, another configuration of the high-band compensation processor 24 will be described with reference to FIGS. 4 and 5A-5C. An example configuration shown in FIGS. 4 and 5A-5C has a characteristic that only a high-band portion of the signal to which the high-band compensation process is applied is extracted and added to the signal before the high-band compensation is applied, and the added signal is output. As shown in FIG. 4, the high-band compensation processor 24 in this example configuration comprises a register 40, the down-sampling unit 32, the up-sampling unit 34, a filtering processor 42, an adder 44, and a selector 46.

The down-sampling unit 32 and the up-sampling unit 34 execute processes similar to the example configuration shown with reference to FIG. 2, and thus will not be described again.

The filtering processor 42 applies a filtering process to the signal to which the 0-signal is inserted at the predetermined frequency, based on a filtering coefficient stored in the register 40. With this process, the filtering processor 42 corrects the inserted 0-signal to a suitable value, and extracts and outputs a signal of a high-band portion among the signal in which the signal of the high-band portion is compensated and leveled. The frequency characteristic obtained by the compensation process can be adjusted by the filtering coefficient stored in the register 40.

The adder 44 adds the signal before the high-band compensation process is applied and the signal of the high-band portion which is output from the filtering processor 42, and generates a signal in which the high-band portion is compensated. The selector 46 selectively outputs the signal to which the high-band compensation process is applied, or the signal which is output from the adder 44. When the high-band compensation process is to be applied, the selector 46 selects and outputs the signal which is output from the adder 44. In this process, the signal which is before the high-band compensation process is applied and which is input to the adder 44 is preferably delayed by a delay circuit (not shown) by a predetermined delay time. With this process, the adder 44 can add the signal before the high-band compensation process is applied and the compensated signal of the high band portion at a synchronized timing.

Figure 5A:
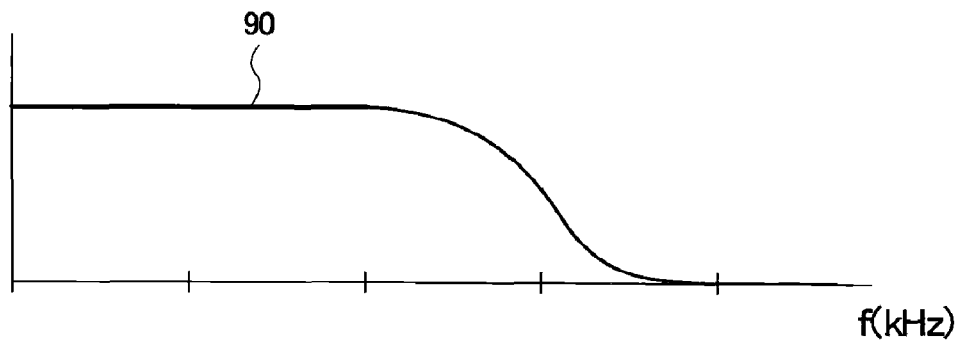
FIG. 5A is a diagram for explaining the high-band compensation process in the preferred embodiment of the present invention.
Figure 5B:
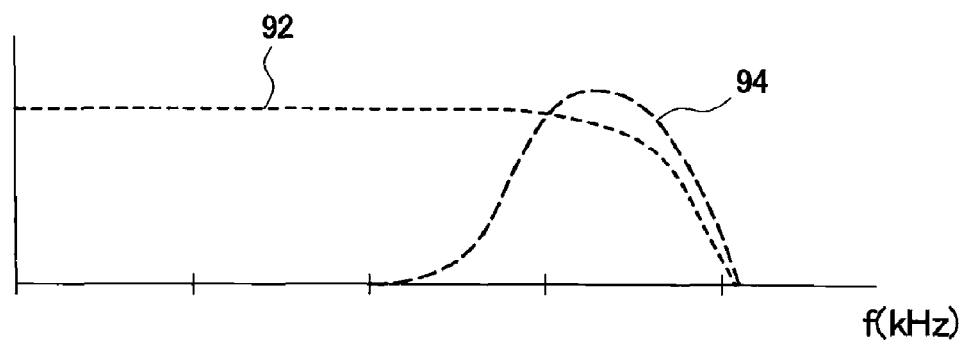
FIG. 5B is a diagram for explaining the high-band compensation process in the preferred embodiment of the present invention.
Figure 5C:
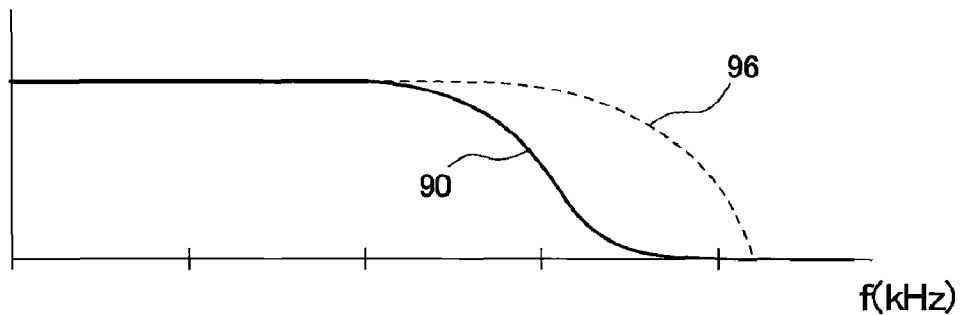
FIG. 5C is a diagram for explaining the high-band compensation process in the preferred embodiment of the present invention.
Figure 6:
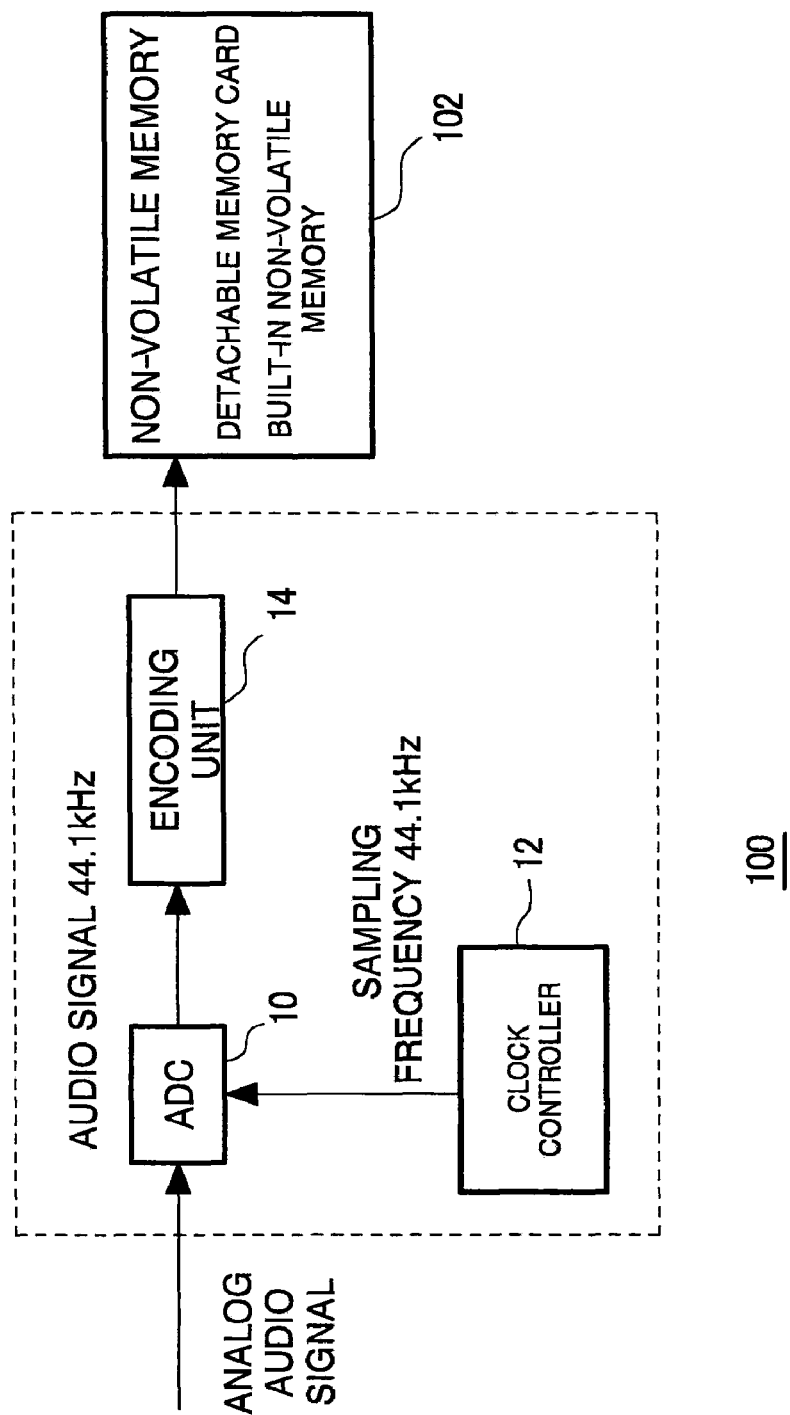
FIG. 6 is a diagram showing a structure of an audio signal processing circuit of related art.

FIG. 5A shows a frequency characteristic 90 of a signal which is output from the ADC 20 and which is a signal before the high-band compensation process is applied. When the high-band compensation process is applied to this signal, a signal of a high frequency region is compensated, and a signal of a frequency characteristic 92 which is higher than that of the signal which is output from the ADC 20 is obtained, as shown in FIG. 5B. In the example configuration of FIG. 4, a high-band portion 94 is extracted from the signal of FIG. 5B, and added to the signal which is output from the ADC 20, to generate a signal having a final frequency characteristic 96 as shown in FIG. 5C, and the processed signal is output.

The example configuration of the high-band compensation processor 24 shown in FIG. 2 is preferred when the upper limit of the frequency characteristic of the audio signal to be processed is relatively low. That is, because the original audio signal contains a small amount of signals in the high-band portion, the possibility of interference with the compensated audio signal of the high-band portion is low. Therefore, the high-band compensation processor 24 can output an audio signal of high quality by outputting the audio signal to which the high-band compensation process is applied, without any further process.

The example configuration of the high-band compensation processor 24 shown in FIG. 4, on the other hand, is preferably used when the upper limit of the frequency characteristic of the audio signal to be processed is relatively high. That is, because the original audio signal contains a relatively large amount of signals in the high-band portion, the possibility of interference with the compensated audio signal of the high-band portion is high. Therefore, the high-band compensation processor 24 can output an audio signal of high quality by removing the high-band portion having a high possibility of interference, adding to the output signal from the ADC 20, and outputting the processed signal.

The encoding unit 26 receives the signal to which the high-band compensation process is applied by the high-band compensation processor 24, and applies an encoding process including a compression process or the like. The encoding unit 26 executes an encoding process according to a predetermined compression method, and stores the result in the non-volatile memory 202. The non-volatile memory 202 may be any of the various memories such as, for example, a detachable memory card, a built-in semiconductor memory, or a hard disk drive, etc.

In the preferred embodiment of the present invention, as shown in FIGS. 2 and 4, the high-band compensation processor 24 has a structure which allows selective output of a signal in which the high-band portion is compensated and a signal to which the high-band compensation process is not applied. When a higher priority is assigned to reduction of the power consumption by the ADC 20, the clock controller 22 outputs a clock of the lower frequency to reduce the sampling frequency of the audio signal which is output by the ADC 20, and the high-band compensation processor 24 outputs an audio signal to which the high-band compensation process is applied. When, on the other hand, a higher priority is assigned to the sound quality of the compressed audio signal which is output by the encoding unit 26, the clock controller 22 outputs a high-frequency clock, to increase the sampling frequency of the audio signal which is output from the ADC 20, and the high-band compensation processor 24 outputs the audio signal to which the high-band compensation process is not applied. By controlling the operations of the clock controller 22 and the high-band compensation processor 24, it is possible to select which of the power consumption of the audio signal processing circuit 200 and the sound quality of the compressed audio signal is to be assigned a higher priority.

With the above-described process, the ADC 20 applies a process with a lower sampling frequency, and the high-band compensation processor 24 applies an compensation process to the audio signal obtained as a result of the process at the ADC 20, to obtain a frequency band which is higher than the signal band sampled by the sampling frequency. Thus, the power consumption at the ADC 20 can be reduced, reduction in the sound quality of the compressed audio signal can be prevented, and a high-quality audio signal can be generated.

What is claimed is:

1. An audio signal processing circuit comprising:
    an analog-to digital converter which converts an audio signal into a digital audio signal of a predetermined sampling frequency;
    a high-band compensation processor which compensates the digital audio signal converted by the analog-to-digital converter to a frequency band which is higher than a signal band sampled by the sampling frequency; and
    an encoding unit which encodes the audio signal processed by the high-band compensation processor, wherein
    the audio signal processing circuit is configured to inhibit power consumption by processing the audio signal at the analog-to-digital converter in a frequency band lower than at the encoding unit; and
    the audio signal processing circuit is configured to obtain a high-quality audio signal by processing the audio signal at the encoder in a frequency band higher than at the analog-to-digital converter.

2. The audio signal processing circuit according to claim 1, wherein
    the high-band compensation processor comprises:
    a down-sampling unit which generates a signal in which a part of the audio signal converted by the analog-to-digital converter is removed;
    an up-sampling unit which inserts a 0-signal to a signal portion removed by the down-sampling unit; and
    a filtering unit which applies a filtering process to the signal processed by the up-sampling unit.

3. The audio signal processing circuit according to claim 2, wherein
    the high-band compensation processor can select whether or not the high-band compensation processor applies the compensation process, and
    the analog-to-digital converter changes the sampling frequency based on whether or not the high-band compensation processor applies the compensation process.

4. The audio signal processing circuit according to claim 1, wherein
    the high-band compensation processor can select whether or not the high-band compensation processor applies the compensation process, and
    the analog-to-digital converter changes the sampling frequency based on whether or not the high-band compensation processor applies the compensation process.

* * * * *